United States Patent [19]
Waldin et al.

[11] Patent Number: 6,094,731
[45] Date of Patent: *Jul. 25, 2000

[54] ANTIVIRUS ACCELERATOR FOR COMPUTER NETWORKS

[75] Inventors: Ray Waldin, San Francisco; Carey Nachenberg, Northridge, both of Calif.

[73] Assignee: Symantec Corporation, Cupertino, Calif.

[*] Notice: This patent is subject to a terminal disclaimer.

[21] Appl. No.: 09/188,919

[22] Filed: Nov. 9, 1998

Related U.S. Application Data

[63] Continuation-in-part of application No. 08/977,408, Nov. 24, 1997, Pat. No. 6,021,510.

[51] Int. Cl.$^7$ ...................................................... G06F 11/00
[52] U.S. Cl. ................................ 714/38; 714/2; 714/33; 714/45; 714/46; 714/48; 395/704
[58] Field of Search .................................. 714/2, 38, 48, 714/33, 45, 46; 395/704

[56] References Cited

U.S. PATENT DOCUMENTS

| | | | |
|---|---|---|---|
| 5,337,360 | 8/1994 | Fisher | 380/23 |
| 5,440,723 | 8/1995 | Arnold et al. | 714/38 |
| 5,502,815 | 5/1996 | Cozza | 714/38 |
| 5,509,120 | 4/1996 | Merkin et al. | 714/46 |
| 5,606,609 | 2/1997 | Houser et al. | 380/4 |
| 5,638,446 | 6/1997 | Rubin | 380/25 |
| 5,649,196 | 7/1997 | Woodhill et al. | 714/1 |
| 5,673,316 | 9/1997 | Auerbach et al. | 380/4 |
| 5,696,822 | 12/1997 | Nachenberg | 714/38 |
| 5,765,030 | 7/1996 | Nachenberg et al. | 714/38 |
| 5,822,517 | 4/1996 | Dotan | 714/38 |
| 5,826,013 | 1/1997 | Nachenberg | 714/33 |
| 5,850,442 | 12/1998 | Muftic | 380/4 |
| 5,892,904 | 12/1996 | Atkinson et al. | 713/201 |

OTHER PUBLICATIONS

Bruce Schneier, *Applied Cryptography* 2d ed., John Wiley & Sons, Inc., U.S.A. (1996), Chapter 18; pp. 429–460.

Whitfield Diffie & Martin E. Hellman, *New Directions in Cryptography, IEEE Transactions on Information Theory*, (Nov. 1976), vol. IT. 22, No. 6; pp. 644–654.

*Primary Examiner*—Stephen S. Hong
*Assistant Examiner*—Wasseem H. Hamdan
*Attorney, Agent, or Firm*—Fenwick & West LLP

[57] ABSTRACT

System, method, and computer readable medium for examining a file (1) associated with an originating computer (2) to determine whether a virus is present within the file (1). File (1) contains at least one sector and is scanned by an antivirus module (3). An identification and hash value of each scanned sector, a date of an update to antivirus module (3), and a version number of antivirus module (3) are stored into a critical sectors file (4). Hash values can be calculated by an antivirus accelerator module (5). An authentication module (12) affixes a digital signature to critical sectors file (4). File (1), critical sectors file (4), and digital signature (15) are then transmitted over network (14) to a recipient computer (11). File (1) sectors that were scanned by originating computer (2) are examined by antivirus module (3'). Each of these sectors again has its hash value calculated and compared with the hash value of the corresponding sector as stored within critical sectors file (4). When any calculated hash value fails to match a corresponding stored hash value for any sector, antivirus module (3') is commanded to rescan the entire file (1). Recipient computer (11) decrypts the digital signature (15) produced by originating computer (2) to verify the authenticity of the contents of critical sectors file (4).

16 Claims, 4 Drawing Sheets

ANTIVIRUS ACCELERATOR FOR COMPUTER NETWORKS

RELATED APPLICATION

A related patent application is U.S. patent application Ser. No. 08/977,408 filed on Nov. 24, 1997 entitled "Antivirus Accelerator" and having the same assignee as the present patent application. This application is a continuation-in-part of U.S. patent application Ser. No. 08/977,408 filed Nov. 24, 1997, now U.S. Pat. No. 6,021,510. Said related patent application is hereby incorporated by reference in its entirety into the present patent application.

TECHNICAL FIELD

This invention pertains to the field of quickly detecting viruses in computer files that are transmitted over a computer network.

BACKGROUND ART

There are several techniques of the prior art that have been used to increase the speed of scanning computer files by antivirus software.

For example, the software product known as Norton AntiVirus (NAV) manufactured by Symantec Corporation runs continuously in the background of a processor. If a file is modified, it is automatically rescanned by NAV. The NAV server-based antivirus software keeps a cache of files that have been scanned and certified clean (virus-free) since the last reboot of the server. If such a file is later accessed by the user, NAV does not rescan the file, since NAV knows that the file is already clean. Such a technique works well for servers, because servers are rarely rebooted, and the same files are used over and over again. However, on desktop (client) computers that are reset frequently, such a cache cannot be maintained for long periods, because desktop computers are rebooted frequently. Furthermore, desktop computers typically contain a relatively low amount of memory.

In a second technique of the prior art, desktop based antivirus programs, such as IBM's AntiVirus, store hash data for each program on the hard drive to speed up scanning operations. Once a file is scanned, a hash value (or simply "hash") of the contents of the file is stored in a database. The hash value is a contraction of the file contents created by a hash function, which may or may not be specifically tailored to the type of the file. Hash functions are described in Schneier, Bruce, *Applied Cryptography* 2d ed. (John Wiley & Sons, Inc.), Chapter 18, pp. 429–460, U.S.A. (1996).

A hash function is a many-to-one function, i.e., more than one file configuration can have the same hash value, although this is highly unlikely. In this prior art technique, during subsequent scans of the file, the hash of the file is first computed by the antivirus software, and if the computed hash matches the hash stored in the database, the file is certified clean by the antivirus software without the necessity for a rescan. This is possible because a match shows, with a high degree of certainty, that the file has not been modified. This technique eliminates the need for costly CPU-intensive rescans of the file.

Currently, the prior art techniques either take a hash of the entire file or specifically tailor their hash to critical areas of the file based upon the internal file format. If these critical areas change, there is a possibility of viral infection. If the areas do not change, the likelihood of viral infection is reduced and the file is not rescanned.

Sophos Ltd. of the United Kingdom is a second company that has a technology for hashing files on a desktop computer and rescanning them only if the hash values have changed.

None of the above techniques is particularly tailored to the safe antivirus scanning of software that is transmitted over a computer network.

DISCLOSURE OF INVENTION

The present invention is a computer-based method and apparatus for examining files (1) for computer viruses. The files (1) are associated with an originating computer (2), then are subsequently sent from the originating computer (2) to a recipient computer (11) over a computer network (14). Each file (1) contains at least one sector. The sectors are identified, e.g., by number. An antivirus module (3) associated with originating computer (2) scans the file (1). The identification of each scanned file sector and a hash value of each scanned sector are stored into a first storage area (4). Additionally, computer (2) affixes a digital signature (15) to the contents of the first storage area (4). When the file (1) is subsequently examined by recipient computer (11), all of the file (1) sectors that were scanned by originating computer (2) are examined by an antivirus accelerator module (5') associated with recipient computer (11). A hash value for each file (1) sector so examined is computed and compared with the hash value for the corresponding sector stored within said first storage area (4). When any computed hash value fails to match a corresponding stored hash value for any sector, the entire file (1) is rescanned by an antivirus scan module (3') associated with the recipient computer (11). Additionally, computer (11) verifies the authenticity of the digital signature (15) to assure that the contents of the file (1) and storage area (4) were not altered during transmission over the network (14).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
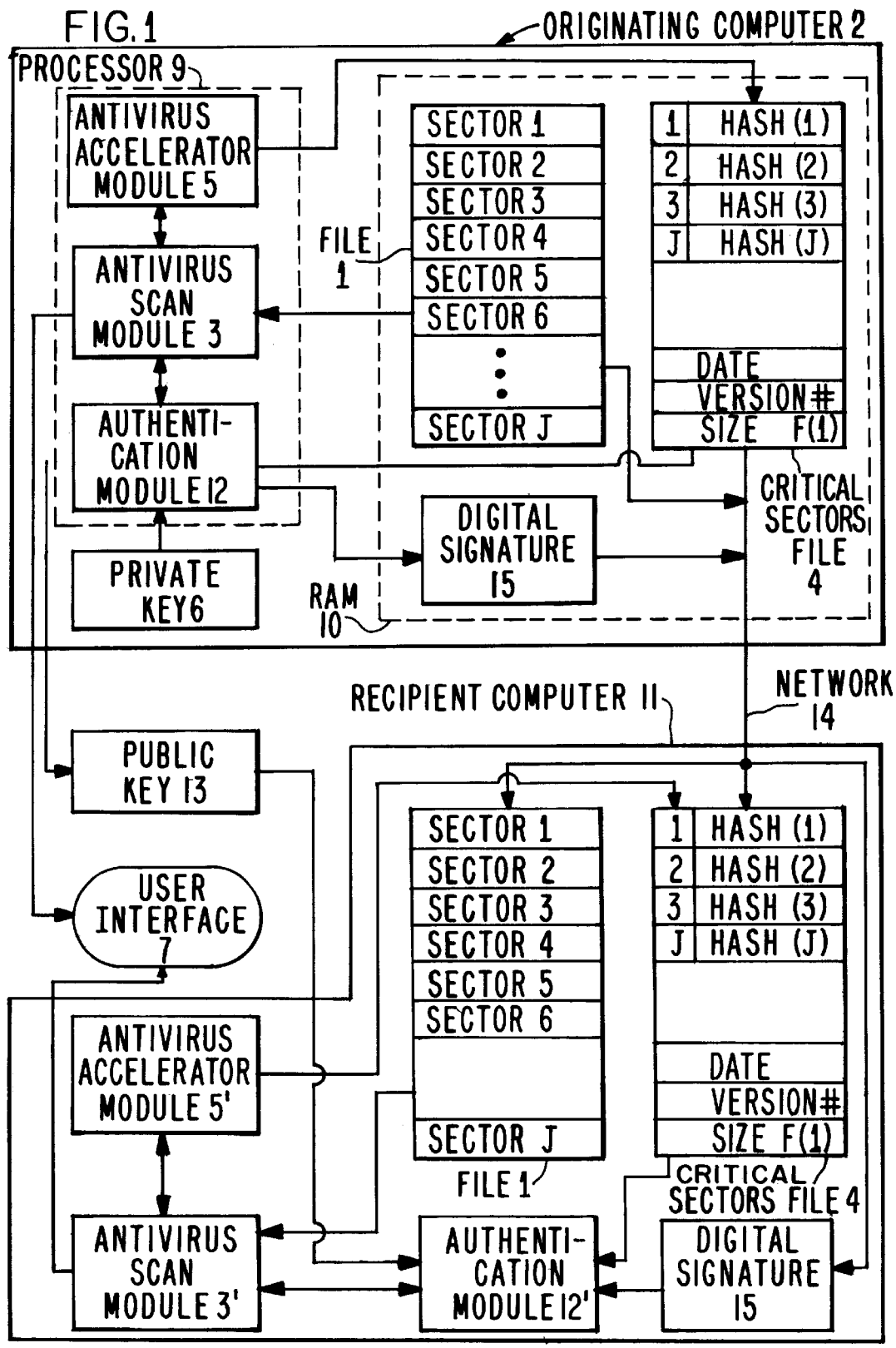
FIG. 1 is a system block diagram illustrating a preferred embodiment of the present invention.
Figure 2:
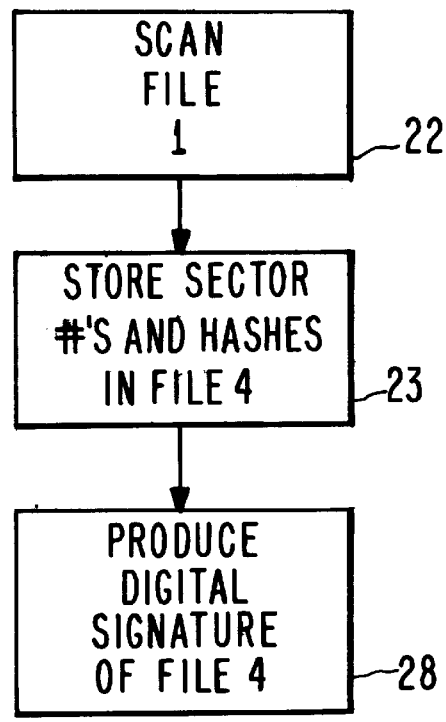
FIG. 2 is a simplified flow diagram illustrating steps performed by an originating computer 2.
Figure 3:
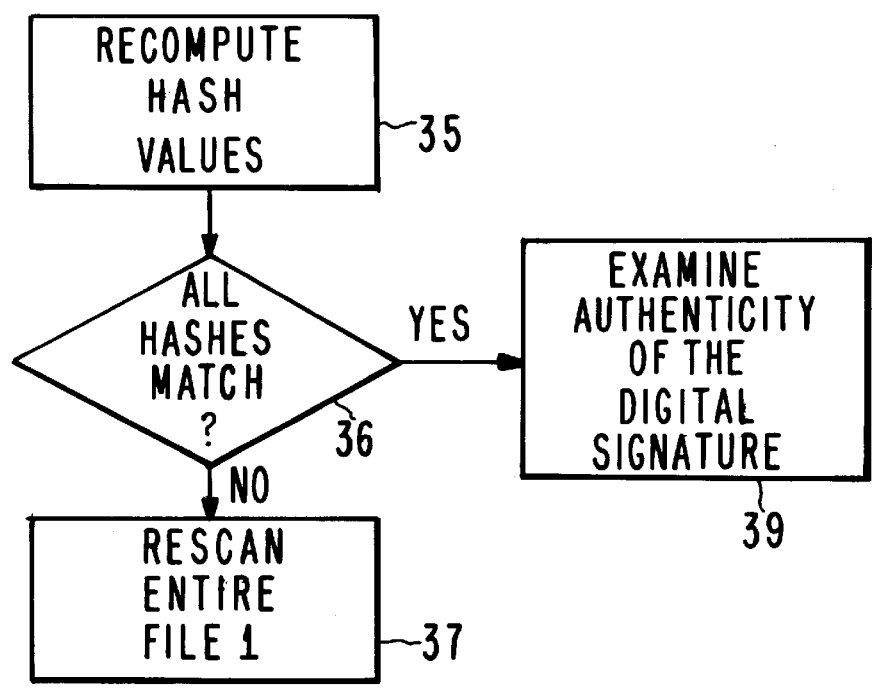
FIG. 3 is a simplified flow diagram illustrating steps performed by a recipient computer 11.

There is a trend for antivirus scanning to become more CPU-bound and less IO-bound. This is because of the popularity of CPU intensive antivirus techniques such as emulation. Because of this trend, it is advantageous to scan files once and to store relevant information about the files, including a hash value of the file, in a database. The next time the file is scanned, its hash value is looked up in the database and matched against the current hash value for that file. If the hash values match, the file need not be rescanned. This is an effective way to eliminate redundant scanning for at least some computers, including servers. However, computing a hash value for the entire file may take longer than an actual antivirus scan for that file, particularly with larger files (such as documents and spreadsheets) that may harbor viruses. If one wishes to compute a hash value for just part of the file in order to speed performance, one has to specifically design parsing and hashing code for each of the major file formats being scanned.

For example, NAV currently contains hashing code for .com and .exe files. For DOS .exe files, NAV computes a hash value from the entry point and header, since this is the most likely location of a viral infection. However, Word for Windows document files (in the OLE and .doc formats) do not have an entry point per se. An antivirus engineer would have to build another parser and hasher for OLE and .doc file formats to properly hash relevant sections of the file to check for viruses. To hash for Excel viruses, one would have to build yet another parser and hasher. A parser is first needed, because the parser can distinguish between critical portions of a file, e.g., distinguish between executable code and data. After the parser has determined what are the critical portions of the file for purposes of antivirus protection, a hasher can be built to create the hash value based upon the critical portions of the file.

Additional difficulties arise when it is desired to transmit files 1 from one or more originating computers 2, over a computer network 14, to one or more recipient computers 11. In such a scenario, the file 1 and hash values are vulnerable during transmission over the network 14. In addition to transmission links (e.g. wires, wireless links), network 14 can comprise one or more server computers, proxy servers, mail gateways, and/or client computers. An attacker at any one of these points could easily intercept the transmission, change the contents of the file 1 being transferred, create a new hash value or values based upon the modified file 1, and forward this altered data to the recipient computer 11. The altered data would appear to be virus free, and thus would not be scanned by recipient computer 11.

The present invention overcomes the disadvantages of the prior art, by offering a technique that:

1. Yields the security of a full file hash while requiring a hash to be taken on only a minimal set of sectors from the file in question;

2. Does not require additional programming of a parser and hasher every time a new virus-hosting file format (such as .com, .exe, .doc, .xls, PowerPoint, etc.) is released; and 3. Uses digital signatures to assure safety of the data in file 1 and in critical sectors file 4 as the data traverses the network 14.

The operation of the present invention will now be described in conjunction with the Figures. A file 1 is to be examined to determine whether or not it contains a virus. File 1 is associated with originating computer 2. FIG. 1 illustrates file 1 as being within computer 2, e.g., file 1 resides within RAM (random access memory) 10 within computer 2. File 1 could originally have been on a hard disk, floppy disk, or any other computer readable medium, and could be (partially or totally) brought into RAM 10 before it is acted upon by modules 3, 5, and 12.

Antivirus scan module 3 can be a conventional antivirus product such as Norton AntiVirus (NAV). FIG. 1 illustrates a separate antivirus accelerator module 5 as performing the acceleration tasks of the present invention, and a separate authentication module 12 as performing the digital signature tasks of the present invention. Alternatively, modules 3, 5, and 12 could be combined into one module or two modules, and just as readily perform the scanning, acceleration, and authentication tasks of the present invention.

Modules 3, 5, and 12 are typically embodied as computer programs, executable by a processor 9 within computer 2. Alternatively, modules 3, 5, and 12 could be firmware and/or hardware modules or any combination of software, firmware, and hardware.

File 1 is divided into sectors. There could be just one sector. FIG. 1 illustrates file 1 as having an integral number J of sectors. The sectors are identified, typically by means of a sector number inserted into an address field associated with each sector.

Module 3 typically examines file 1 for viruses when:

1. File 1 is being examined for the very first time ever;

2. File 1 is being re-examined after it has been determined that the contents of file 1 have changed;

3. A virus definition within antivirus scan module 3 has changed; or

4. An antivirus scanning engine within antivirus scan module 3 has changed.

As used in this specification and claims, a "digital signature" is a technique from the field of public key cryptography. Public key cryptography was first introduced in a paper authored by Whitfield Diffie and Martin Hellman in a paper entitled "New Directions in Cryptography", *IEEE Transactions on Information Theory,* November 1976. The first practical implementation of public key cryptography was invented by Rivest, Shamir, and Adelman and described in U.S. Pat. No. 4,405,829. In public key cryptography, a private key known only to the user and a mathematically related public key made available to the public are used to encrypt data, decrypt data, and provide authentication techniques using digital signatures. Consequently, authentication module 12 of the present invention has associated therewith a private key 6 and a related public key 13. The private key 6 may be stored within computer 2.

Public key 13 is stored at a public or quasi-public location, i.e., any location accessible by recipient computer 11. This location may be, for example, within a computer that is connected to the Internet. The authenticity of public key 13 may be verified by a Certificate Authority (CA) such as VeriSign, Inc. of Mountain View, Calif. If there are multiple originators 2 and recipients 11, each recipient 11 has access to the public keys 13 associated with all of the originators 2.

The following steps are performed by originating computer 2:

1. The contents of critical sectors file 4 are set to zero (step 40). File 4 is in any storage area separate from file 1, and is typically located in RAM 10 to maximize speed.

2. Antivirus scan module 3 is invoked to scan file 1 in the normal manner (step 22). Depending upon the scanning engines within module 3, less than all of the sectors of file 1 may be scanned, or all the sectors may be scanned.

3. During the scanning of file 1, module 5 places into critical sectors file 4 the identification (e.g., number) of each of the sectors that is scanned (step 23). Alternative to module 5 performing this task, this can be done automatically every time a sector is read from file 1, via hooks attached to read and seek functions of the engines within antivirus scan module 3. As each sector is operated upon by module 3, module 5 calculates the hash value for that sector, and inserts the hash value into file 4 (also step 23). FIG. 1 illustrates the special case where four sectors are scanned, namely sectors 1, 2, 3, and J.

4. Module 5 determines the size of file 1 and places this value into file 4 (step 41). Also in step 41, module 5 places into file 4 the date that updated virus definitions were most recently added to antivirus scan module 3, and the version number of antivirus scan module 3.

5. If a virus is detected by module 3 (step 42), module 3 typically informs the user, by sending a message via user interface 7, e.g., a monitor (step 43). If, on the other hand, module 3 does not detect a virus in file 1 (step 42), authentication module 12 is invoked to perform steps 44, 45, and 28.

6. In step 44, authentication module 12 encodes the contents of file 4 into a form appropriate for transmission. For example, Internet e-mail (as described in RFC822 appearing at http://ds.internic.net/rfc/rfc822.txt) is typically restricted to seven bit ASCII text. Therefore, if Internet e-mail is used to send file 1 over network 14, the contents of file 4 are encoded using the seven bit base 64 standard as described in RFC1341, section 5.2 (discussed at http://ds.internic.net/rfc/rfc1341.txt). Encoding step 44 is an optional step, because, for some applications, it is not required. Also, step 44 can be done in any order with respect to steps 45 and 28, as long as corresponding steps performed by recipient computer 11 are performed in a compatible order.

7. In step 45, authentication module 12 packages the encoded contents of file 4, i.e., "attaches" the encoded contents to the original file 1 using a transmission specific format. For example, in the case of Internet e-mail, which consists of header fields followed by the e-mail body, the encoded contents of file 4 are attached to the e-mail as a header field. An example of this is given infra.

8. In step 28, authentication module 12 produces the digital signature 15 of file 4. This is preferably done in four sub-steps: 46, 47, 48, and 49. In sub-step 46, a message digest is computed for the entire contents of file 4 using a standard message digest algorithm such as MD5. MD5 is described in RFC1321 at http://ds.internic.net/rfc/rfc1321.txt. The purpose of creating this message digest is to reduce the size of file 4 to speed the calculation of the digital signature 15 and the transmission of same over network 14. The message digest contains a fixed number of bits, typically 128, which are computationally infeasible to forge. In sub-step 47, the message digest is encrypted with private key 6 using a standard public key encryption algorithm, such as that described in the aforesaid U.S. Pat. No. 4,405,829, or the PKCS #1 RSA encryption standard as described in ftp://ftp.rsa.com/pub/pkcs/ascii/pkcs-1.asc. The result is the digital signature 15 of the message digest. In sub-step 48, the digital signature 15 is encoded into a form appropriate for transmission over network 14, as described above in conjunction with step 44. In sub-step 49, the digital signature 15 is "attached" to the original file 1 using a transmission specific format, as described above in conjunction with step 45.

9. Finally, in step 60, file 1, file 4, and the digital signature 15 are sent over network 14 to recipient computer 11.

Here is an example of how the present invention appears when applied to typical Internet e-mail:

The original e-mail might look like this:
From: me@here.net
To: you@there.net
Subject: something interesting
When in the course of human events . . .
The e-mail with hash values 4 added looks like:
From: me@here.net
To: you@there.net
Subject: something interesting
X-NAVHashes: RlbHRhQ2F0YWxvZz4NCg==
When in the course of human events . .

The e-mail with a digitally signed set of hash values looks like:
From: me@here.net
To: you@there.net
Subject: something interesting
X-NAVHashes: RlbHRhQ2F0YWxvZz4NCg==
X-NAVHashSignature: dHA6Ly8xNTUuNjQdHATa==
When in the course of human events . . .

Recipient computer 11 contains modules 3', 5', and 12' that are identical to modules 3, 5, and 12, respectively. If these modules are not identical to the corresponding modules contained within originating computer 2, the entire contents of file 1 have to be re-examined for viruses, as the contents of file 1 cannot in that case be certified as virus-free.

At recipient computer 11, the following steps are performed:

1. At step 57, the contents of file 4 are decoded. Module 5' determines the size of file 1, and compares this determined size versus the size of file 1 that has been previously stored in file 4. If these two numbers are different, module 5' concludes that the contents of file 1 have changed in some way, and commands module 3' to rescan the entire file 1 for viruses (step 37), commencing with step 40, as described above. Also in step 57, module 5' determines the date that virus definitions were most recently updated to scan module 3' and compares this determined date versus the date contained within file 4. If these two dates are different, module 5' commands module 3' to rescan the entire file 1 for viruses (step 37), commencing with step 40, as described above. Also in step 57, module 5' determines the version number of scan module 3', and compares this version number with the version number stored within file 4. If these two version numbers are different, module 5' commands module 3' to rescan the entire contents of file 1 for viruses (step 37), commencing with step 40, as described above.

2. If the sizes, dates, and version numbers match, module 5' determines from file 4 what file 1 sectors have previously been scanned (step 35). Module 5' then computes the hash values for each of those prescanned sectors, and respectively compares the computed hash values against the prestored (in file 4) hash values (step 36).

Figure 4:
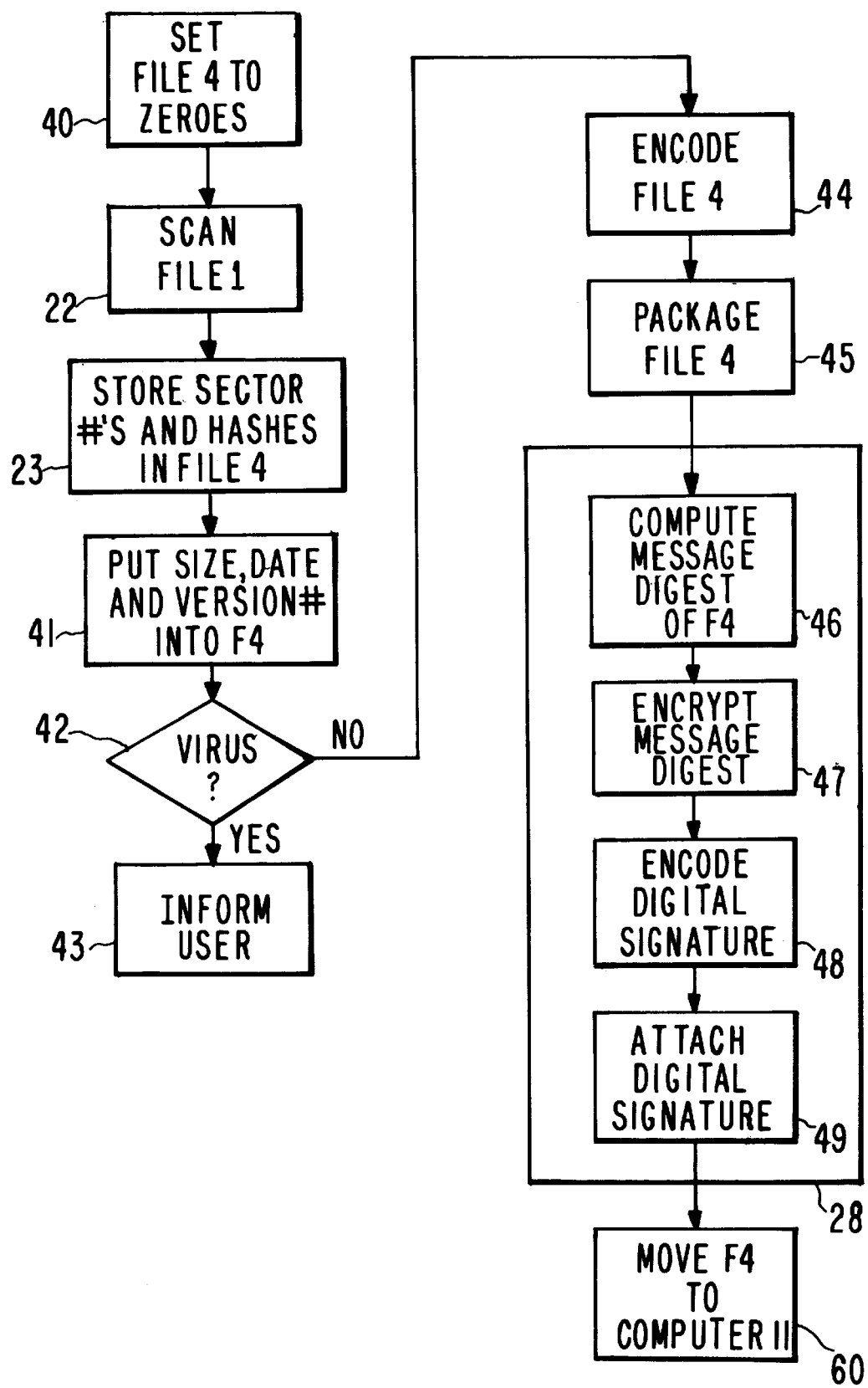
FIG. 4 is a detailed flow diagram illustrating a preferred embodiment of steps performed by an originating computer 2.
Figure 5:
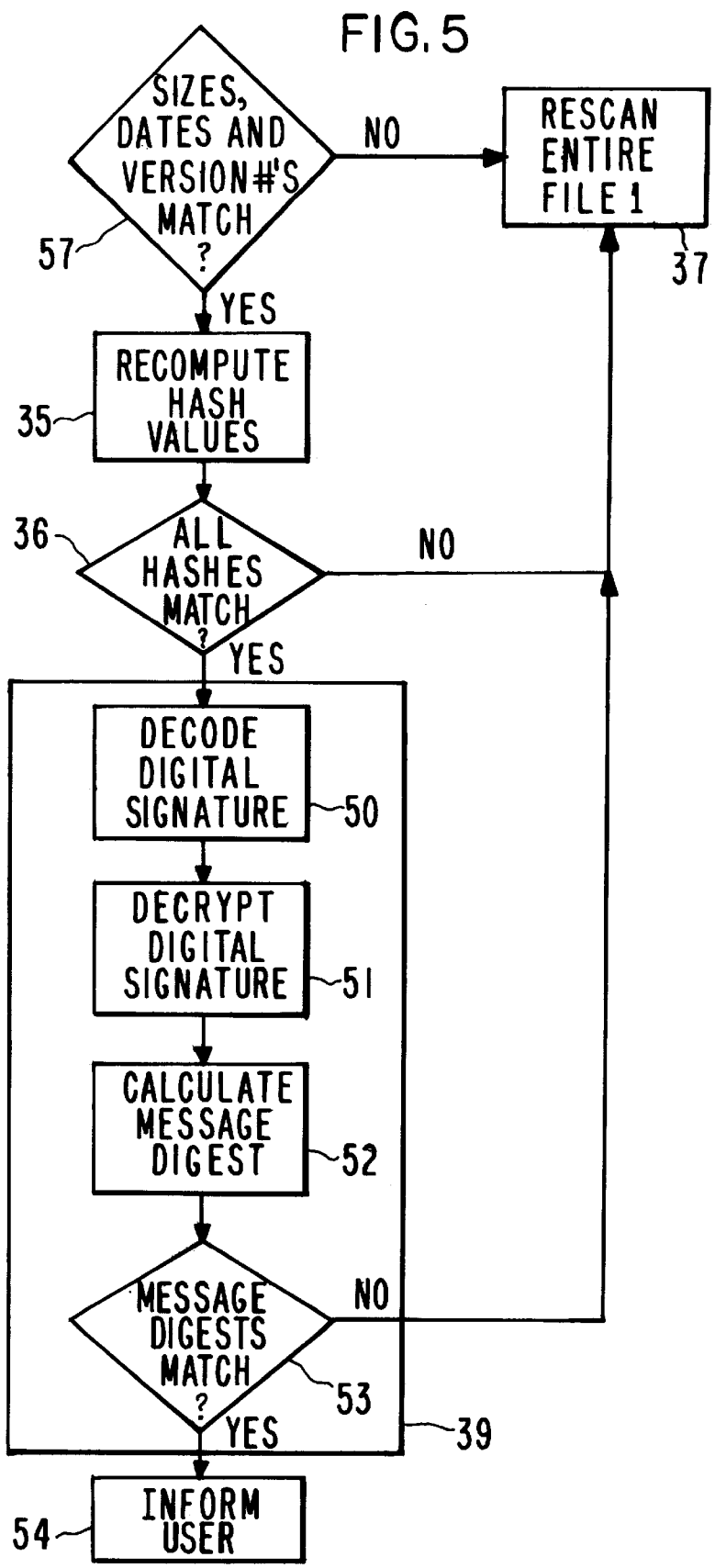
FIG. 5 is a detailed flow diagram illustrating a preferred embodiment of steps performed by a recipient computer 11.

3. If any computed hash value fails to match the corresponding pre-stored hash value for that sector, module 5' commands module 3' to rescan the entire file 1 for viruses (step 37). If, during this execution of step 37, module 3' certifies file 1 as being free of viruses, the steps illustrated in FIG. 4 should be repeated by originating computer 2.

4. If all of the recently computed hash values are respectively identical to all of the pre-stored hash values, authentication module 12' examines the authenticity of digital signature 15 (step 39). This is preferably done via four substeps: 50, 51, 52, and 53. In sub-step 50, authentication module 12' decodes the encoded digital signature 15. In sub-step 51, authentication module 12' decrypts the digital signature 15 using public key 13, producing a decrypted message digest. In sub-step 52, authentication module 12' calculates a new message digest of the contents of critical sectors file 4, using the same message digest algorithm that was used by module 12 of originating computer 2. In sub-step 53, the decrypted message digest is compared with the calculated message digest. If these two numbers do not match, the transmitted data have been changed in some way and the entire contents of file 1 must be rescanned for viruses, unequivocally (step 37). If the decrypted transmitted message digest is identical to the calculated message digest, the contents of file 1 are deemed by authentication module 12' to be "unchanged in a way that could allow for a viral infection". This information may be conveyed to the user, e.g., via user interface 7 (step 54).

Steps 44, 45, and 28 can be performed at a different time than steps 40, 22, 23, 41, and 42. For example, originating computer 2 could be controlled by a software publisher. At a first time, the software publisher certifies a software product as being virus free, and at a second time, the publisher disseminates the software to one or more recipients 11.

Module 12 could be a separate product from modules 3 and 5. Module 12 could be at a separate location from modules 3 and 5, i.e., modules 3 and 5 could be at a first location and modules 3, 5, and 12 at a second location. Normally, module 12 should not be used in the absence of modules 3 and 5. For example, the authentication steps of the present invention could be done by a proxy server within network 14. It this case, the antivirus scan would be performed twice (by originating computer 2 and by the proxy server), but the authentication would be performed by just the proxy server.

Recipient computer 11 could be the same as originating computer 2. For example, originating computer 2 might want to send file 1 to a remote location for backup purposes and, when file 1 was brought back to the original location, originating computer 2 would want to check to see whether file 1 is virus free. In this case, computer 2 acts as both the originator and the recipient.

Any time any change is made to antivirus scan module 3, such as putting in new virus definitions or changing the scanning engines, file 1 must be rescanned for viruses.

The present invention overcomes the flaws of the prior art, for the following reasons:

1. With respect to scanning and hashing a minimal set of sectors in file 1, the present invention calculates hash values for only those sectors actually retrieved by module 5. Module 3 is deterministic, i.e., it always acts in the same way with the same file 1. Therefore, module 3 always scans the same set of sectors, unless file 1 changes in length or the contents of those sectors change in some way. If a sector that is not in the set of sectors retrieved from file 4 changes, module 3 is oblivious to that fact. But that is of no import to the present invention, because module 3 never scanned that sector to begin with. Module 3 will always detect all of the viruses that it currently knows how to detect, by looking only at the critical fixed set of sectors that has been stored in file 4.

For example, let us assume that the scanning engines within module 3 virus-scan sectors 1, 3, and 10 from a file 1 of size 10K. If a change were made to either sectors 1, 3, or 10, module 3 would notice the change, since it reads and scans these three sectors. Thus, file 1 would definitely need to be rescanned. However, if a change were made to another sector, say sector 5, and the size of file 1 did not change, none of the scanning engines would have detected nor cared about this change. This would be outside the set of sectors that must be examined to detect a virus according to the current scanning engines with their current set of data. A new version of module 3 might check for sectors 1, 3, 5, and 10. At that time, file 1 would be scanned anew, and a virus in sector 5 would be detected.

2. With respect to the prior art flaw of requiring additional programming of parsers and hashers to support new file formats, the antivirus accelerator module 5 of the present invention automatically hashes all sectors scanned by module 3 in the same way, regardless of the contents of the sectors. No new parser or hasher coding needs to be performed and incorporated into module 5 to support new file formats. Once a new scanning engine is incorporated into module 3, file 1 is scanned anew, as discussed above. From this point on, the old scanning engines scan the original set of sectors, for example 1, 3, and 10, and the new scanning engine scans new sectors, say 5 and 6. Critical sectors file 4 then contains information for sectors 1, 3, 5, 6, and 10, and the invention works as before.

Using prior art techniques, the antivirus developer would have to actually build a parser module to specifically traverse the file having the new format, then hash the information in a way that is specifically attuned to that particular file format, an expensive and time consuming process. With the present invention, once the developer has built a new scan module 3, the hashing of the relevant sectors is done automatically whenever the relevant sectors are reloaded into file 4.

3. The present invention can safely be used when file 1 is sent over a network 14, including an open network such as the Internet.

4. Using the present invention in a network environment can reduce the number of times a file is scanned as it is being transferred over the network 14. In the prior art, a file 1 may be scanned once for each computer it traverses over the network 14. Using the techniques of the present invention, only one virus scan is required during a network 14 file transfer: at the first computer encountered that employs this invention. All other computers situated within the network 14 employing this invention can quickly determine that file 1 does not require rescanning as long as the decrypted digital signature 15 of the message digest of file 4 matches the recomputed message digest.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-based method for examining a file that is transmitted over a computer network from an originating computer to a recipient computer to determine whether a computer virus is present within said file, said file containing at least one sector, the method comprising the steps of:

causing the originating computer to:

scan the file by an associated antivirus module while storing into a first storage area an identification of each file sector that is scanned and a hash value of each sector that is scanned; and calculate a digital signature of a computed message digest of contents of the first storage area; and causing the recipient computer to:

compute a hash value for each file sector that was scanned by the originating computer, to generate a computed hash value;

compare each computed hash value with the hash value stored within said first storage area for the corresponding sector, wherein, when any computed hash value fails to match a corresponding stored hash value for any sector, the entire file is rescanned;

examine the authenticity of the digital signature by comparing a decrypted message digest with the computed message digest; and rescan the entire file when the decrypted message digest does not match the computed message digest.

2. The method of claim 1 comprising the additional step of setting the entire contents of the first storage area to zero prior to performing the steps that are performed by the originating computer.

3. The method of claim 1 wherein, during the scanning of the file by the antivirus module, sector numbers are automatically read into the first storage area by means of hooks associated with engines of the antivirus module.

4. The method of claim 1 wherein the antivirus module determines the size of the file and stores said size within the first storage area.

5. The method of claim 4 wherein the recipient computer computes the size of the file, and when the computed file size differs from the file size stored within the first storage area, the entire file is rescanned for viruses by an antivirus module associated with the recipient computer.

6. The method of claim 1, wherein, when all the computed hash values respectively match the stored hash values, and, in addition, the authenticity of the digital signature has been verified, the recipient computer declares that the file is unchanged in a way that could allow for a viral infection.

7. The method of claim 1, wherein, when the antivirus module fails to detect a virus in the file, the originating computer causes the file, the contents of the first storage area, and the digital signature to be transmitted over the computer network to the recipient computer.

8. The method of claim 7, wherein the recipient computer computes hash values by an associated antivirus module that is identical to the antivirus module associated with the originating computer.

9. The method of claim 8, wherein, when the antivirus module associated with the originating computer differs from the antivirus module associated with the recipient computer, the contents of the first storage area are deemed to be invalid and the file is reexamined for viruses.

10. The method of claim 1, wherein the originating computer stores into the first storage area a date of a most recent update to the antivirus module and a version number of the antivirus module.

11. The method of claim 10, wherein the recipient computer checks the date and the version number from the first storage area against a date of a most recent update to the antivirus module associated with the recipient computer and a version number of the antivirus module associated with the recipient computer, respectively, and when at least one entity from the group of entities comprising the date and the version number fails to match, the entire file is rescanned for viruses.

12. The method of claim 1, wherein a private key and a related public key are associated with the originating computer;
the originating computer calculates the digital signature by means of applying the private key to contents of the first storage area; and
the recipient computer examines the authenticity of the digital signature by means of applying the public key to the digital signature.

13. The method of claim 12, wherein a hash function is applied to contents of the first storage area before the originating computer calculates the digital signature.

14. The method of claim 1, wherein the computer network contains at least one entity from the group of entities comprising server computers, proxy servers, mail gateways, and client computers.

15. Apparatus for speeding the detection of computer viruses, the apparatus comprising:
a first file associated with an originating computer and containing at least one sector;
coupled to the first file, an antivirus scan module adapted to detect the presence of computer viruses within said first file;
coupled to the antivirus scan module, an antivirus accelerator module;
a critical sectors file coupled to the antivirus accelerator module, said critical sectors file containing the size of the first file, identifications of sectors of the first file that have been scanned by the antivirus scan module, and a hash value for each sector of the first file that has been scanned by the antivirus scan module; and
coupled to the critical sectors file, an authentication module adapted for affixing a digital signature to contents of the critical sectors file and adapted for comparing a decrypted message digest of a received file with a computed message digest, wherein the antivirus scan module rescans the entire file when the decrypted message digest does not match the computed message digest.

16. A computer-readable medium storing a program for examining a file that is transmitted over a computer network from an originating computer to a recipient computer to determine whether a computer virus is present within the file, the file containing at least one sector, the program implementing a method comprising the steps of:
causing the originating computer to:
scan the file by an associated antivirus module while storing into a first storage area an identification of each file sector that is scanned and a hash value of each sector that is scanned; and
calculate a digital signature of a computed message digest of contents of the first storage area; and
causing the recipient computer to:
compute a hash value for each file sector that was scanned by the originating computer, to generate a computed hash value;
compare each computed hash value with the hash value stored within said first storage area for the corresponding sector, wherein, when any computed hash value fails to match a corresponding stored hash value for any sector, the entire file is rescanned;
examine the authenticity of the digital signature by comparing a decrypted message digest with the computed message digest; and
rescan the entire file when the decrypted message digest does not match the computed message digest.

* * * * *